Figure 1:
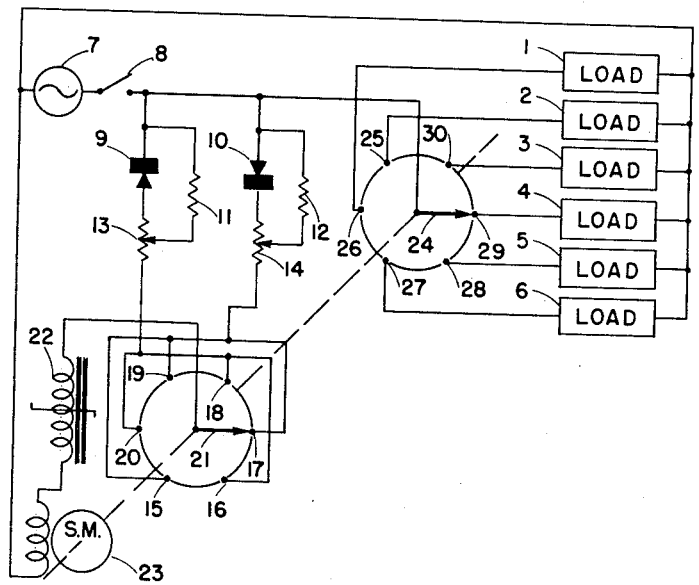

Feb. 26, 1957      H. J. DOWNES      2,783,428

MAGNETIC TIMING DEVICE FOR PERIODIC STEPPING OF MOTOR

Filed Aug. 17, 1953

*INVENTOR.*
HAROLD J. DOWNES

BY

*William L. Lane*

ATTORNEY

United States Patent Office 2,783,428
Patented Feb. 26, 1957

2,783,428

MAGNETIC TIMING DEVICE FOR PERIODIC STEPPING OF MOTOR

Harold J. Downes, Downey, Calif., assignor to North American Aviation, Inc.

Application August 17, 1953, Serial No. 374,795

3 Claims. (Cl. 318—443)

This invention relates to saturable reactors, and particularly to a device for utilizing the properties of a saturable core reactor to obtain a definite time between switching operations.

In many automatic and semi-automatic machines it is necessary to energize a number of valves, motors, relays, or other electrical devices in sequence with a predetermined time separation between the various energizations. For example, in an automatic dishwasher the complete cycle involves, in order, the steps of closing the drain valve, opening the water supply valve, starting the water impeller, closing the water supply valve, opening the drain valve, closing the drain valve, opening the water supply valve, closing the water supply valve, opening the drain valve, energizing the air heater, opening the lid, and shutting off the impeller. These various operations are controlled in sequence by a timer consisting of a synchronous motor, a gear train, and a plurality of microswitches actuated by cams driven by the gear train and a plurality of relays. If the supply voltage to the synchronous motor for the timer is low, the motor tends to be overloaded and will burn out. In addition, repeated operation gradually wears out the gear train, cams, and microswitches. This invention contemplates a timer adapted to perform this operation and related sequential switching operations with a minimum of moving parts and a minimum of necessary maintenance because of the use of a saturable reactor as the basic timing element. Before saturation, the winding of a saturable core reactor presents a relatively high impedance to current flow through it. After saturation this impedance is much lower, being limited to the resistance of the wire wound on the core. Saturation requires the application of a certain predetermined integral of voltage and time, dependent upon the size of the core. Saturation may be accomplished by the application of a single voltage pulse over a sufficient length of time, or by a succession of small unidirectional voltage pulses, each applied over a smaller length of time. In this invention a saturable core reactor requiring a relatively large voltage time integral for saturation is utilized. Each cycle of the alternating current supply contributes a portion of this necessary voltage time integral so that a relatively large number of cycles of the supply voltage is required to saturate the core. When saturation occurs, the impedance of the core drops nearly to zero and energy flows to a step motor which then performs the actual operation of switching power from one load to another. The step motor also switches the direction of application of energy to the core so that the core then commences to become saturated by current flow in the opposite direction. Saturating the core in the opposite direction also requires a predetermined amount of time, and when saturation is complete in this direction an additional step is taken by the step motor to perform another switching operation.

It is therefore an object of this invention to provide an improved timing circuit.

It is another object of this invention to provide a timing circuit utilizing the properties of a saturable core reactor.

It is another object of this invention to provide a saturable core reactor timing circuit adapted to time the successive application of an electrical signal to a plurality of loads by the use of a single saturable core reactor.

Figure 2:
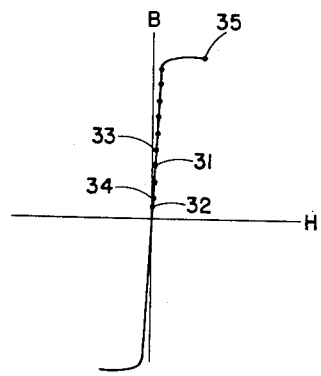

Other objects of invention will become apparent from the following description taken in connection with the accompanying drawings, in which Fig. 1 is a circuit diagram of the invention; and Fig. 2 is a plot of a saturation curve of the saturable reactor core utilized in the invention.

Referring to the drawings, it is required to energize loads 1, 2, 3, 4, 5, and 6 successively from alternating current source 7. Source 7 is connected by switch 8 to rectifiers 9 and 10, resistors 11 and 12, and potentiometers 13 and 14 which in turn are connected as shown to terminals 15, 16, 17, 18, 19, and 20 of rotary switch 21. It will be noted that potentiometers 13 and 14 are respectively connected to alternate contacts of rotary switch 21 and that rectifiers 9 and 10 are oppositely poled. Saturable core reactor 22 is connected to switch 21 as shown and to step motor 23. Step motor 23 is connected to drive switch 21 and switch 24 having terminals 25, 26, 27, 28, 29, and 30 connected to loads 2, 1, 6, 5, 4, and 3, respectively.

The device is set into operation by closing switch 8. If it is assumed that the core of reactor 22 is initially unsaturated, and if switches 21 and 24 are in the positions shown in the figure, current flows on the first positive half-cycle through rectifier 10, resistor 12, and potentiometer 14 to terminal 17 of switch 21 and thence through the core of reactor 22 and to step motor 23 as shown. Before saturation, core 22 presents a high impedance to the current so that practically no current flows through the winding of step motor 23. Current also flows through switch terminal 29 and through switch 24 to load 4 as shown. During the next half-cycle of the supply voltage, current is prevented from flowing through rectifier 10 but flows through a portion of potentiometer 14 and through resistor 12. If the combined resistance of the portion of potentiometer 14 through which current flows on this half-cycle and the resistance of resistor 12 is less than the combined resistance of potentiometer 14, resistor 12 and rectifier 10 for forward flow of current, the core of saturable reactor 22 tends to be desaturated by an amount not quite equivalent to the amount by which it tended to be saturated during the previous half-cycle.

Turning to Fig. 2, the first half-cycle might represent a partial saturation of the core as at point 31 on the curve. During the second half-cycle, however, the condition of the core would be represented by point 32 on the curve of Fig. 2. During the third half-cycle of source 7, current again flows through rectifier 10, resulting in an additional increment of saturation of the core of saturable reactor 22, as represented by point 33 on the curve of Fig. 2.

At the end of the fourth half-cycle, the condition of the core is as represented by point 34 on the curve of Fig. 2. By adjustment of the position of potentiometer 14 the size of the increments toward saturation of the core of reactor 22 may be adjusted so that saturation occurs after any predetermined number of cycles of source 7.

Accordingly, the core becomes saturated as represented by point 35 on the curve, and a relatively large pulse of current is applied to the winding of step motor 23 which causes the step motor to be actuated to advance switch 21 to terminal 16 and to advance switch 24 to terminal 28. Current is now applied to load 5 and discontinued from load 4. Simultaneously, the circuit including rectifier 9, resistor 11, and potentiometer 13 commences operation. Since rectifier 9 is disposed in the opposite direction from rectifier 10, current now tends to flow in the opposite direction through saturable reactor 22, and saturable reactor 22 tends to be desaturated in steps in the same manner in which it was saturated by the action of rectifier 10, resistor 12, and potentiometer 14. By adjustment of the position of potentiometer 13 a time interval for desaturation either equivalent to, less than, or more than the interval required for saturation thereof may be established.

In a similar manner, by a successive saturation and desaturation of the core of saturable reactor 22, switches 21 and 24 are advanced to successive switch positions to supply current from source 7 to loads 1, 2, 3, 4, 5, and 6 in succession. By setting potentiometers 13 and 14 differently the time of application of current to each of the loads may be caused to be different or the same. If potentiometers 13 and 14 and resistors 11 and 12 are of very low resistance value, the current flowing through the saturable reactor after saturation may be quite large so as to assure a positive actuation of step motor 23. Since the saturating and desaturating current paths for the core may be placed in proximity, the variation with temperature of resistors 11 and 12 and potentiometers 13 and 14 will be of no effect, since if resistor 11 increases in resistance, potentiometer 13 also increases in resistance. To discontinue operation of the device, switch 8 may be opened.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Time delay means for causing a predetermined time delay between the closing of a switch and the application of a predetermined electrical current to a load comprising an alternating current source, a load impedance connected by one terminal to one terminal of said source, a saturable core reactor connected in series with said impedance, means connected to be actuated by said load impedance for reversing the direction of saturation of said saturable reactor core, a first resistor, a rectifier and a switch connected in series between the other terminal of said source and the other terminal of said saturable reactor, and a second resistor connected in parallel with said rectifier and said first resistor whereby current is applied to said load impedance a predetermined time after said switch is closed.

2. Means for energizing a plurality of load impedances successively for predetermined lengths of time, comprising a source of alternating current, a rotary switch connected to said source for applying current to each of said load impedances in succession, a step motor for actuating said rotary switch, a saturable reactor core connected to energize said step motor when saturated, means energized by said source for saturating said saturable reactor core after a predetermined number of cycles of said alternating current source, and a second rotary switch connected to be actuated by said step motor for reversing the direction of saturation of said saturable reactor core each time it is saturated.

3. A device as recited in claim 1 in which one of said resistors is variable to thereby provide for an adjustment in said predetermined time delay.

References Cited in the file of this patent
UNITED STATES PATENTS

| | | |
|---|---|---|
| 1,997,179 | Logan | Apr. 9, 1935 |
| 2,126,790 | Logan | Aug. 16, 1938 |
| 2,577,137 | Low | Dec. 4, 1951 |
| 2,653,200 | Foster et al. | Sept. 22, 1953 |
| 2,659,853 | Morrison | Nov. 17, 1953 |